United States Patent [19]
Blankers

[11] Patent Number: 5,925,989
[45] Date of Patent: *Jul. 20, 1999

[54] BUCK CONVERTER SWITCHING SCHEME

[75] Inventor: Hendrik J. Blankers, Eindhoven, Netherlands

[73] Assignee: U.S. Philips Corporation, New York, N.Y.

[ * ] Notice: This patent is subject to a terminal disclaimer.

[21] Appl. No.: 08/726,708

[22] Filed: Oct. 7, 1996

[30] Foreign Application Priority Data

Oct. 9, 1995 [EP] European Pat. Off. .............. 95202698

[51] Int. Cl.$^6$ ................................................... H05B 41/29
[52] U.S. Cl. ..................... 315/307; 315/223; 315/209 R; 315/219; 315/283; 315/DIG. 7
[58] Field of Search ................................ 363/15, 18, 131; 315/307, 247, 224, DIG. 7, 212, 223, 274, 283, 209 R, 219

[56] References Cited

U.S. PATENT DOCUMENTS

| | | | |
|---|---|---|---|
| 3,969,652 | 7/1976 | Herzog | 315/224 |
| 4,694,240 | 9/1987 | Grunsch | 323/285 |
| 5,068,572 | 11/1991 | Blankers | 315/209 R |
| 5,490,055 | 2/1996 | Boylan et al. | 363/41 |

*Primary Examiner*—Arnold Kinkead
*Attorney, Agent, or Firm*—Edward Blocker; Bernard Franzblau

[57] ABSTRACT

A circuit arrangement for igniting and operating a high-pressure discharge lamp is provided with a switching device, inductive device and a rectifier which together form a Buck converter, connected to input terminals for connection to a supply source and output terminals for connection of the lamp. The lamp is supplied with a current through periodic switching of the switching device alternatively into a conducting and a non-conducting state by means of a switch-on and switch-off signal, respectively. The inductive device includes a primary and a secondary winding with the secondary winding forming part of an integration network for generating the switch-off signal. The secondary winding also forms part of a voltage divider network for generating the switch-on signal. A very simple circuit arrangement is thereby achieved.

17 Claims, 1 Drawing Sheet

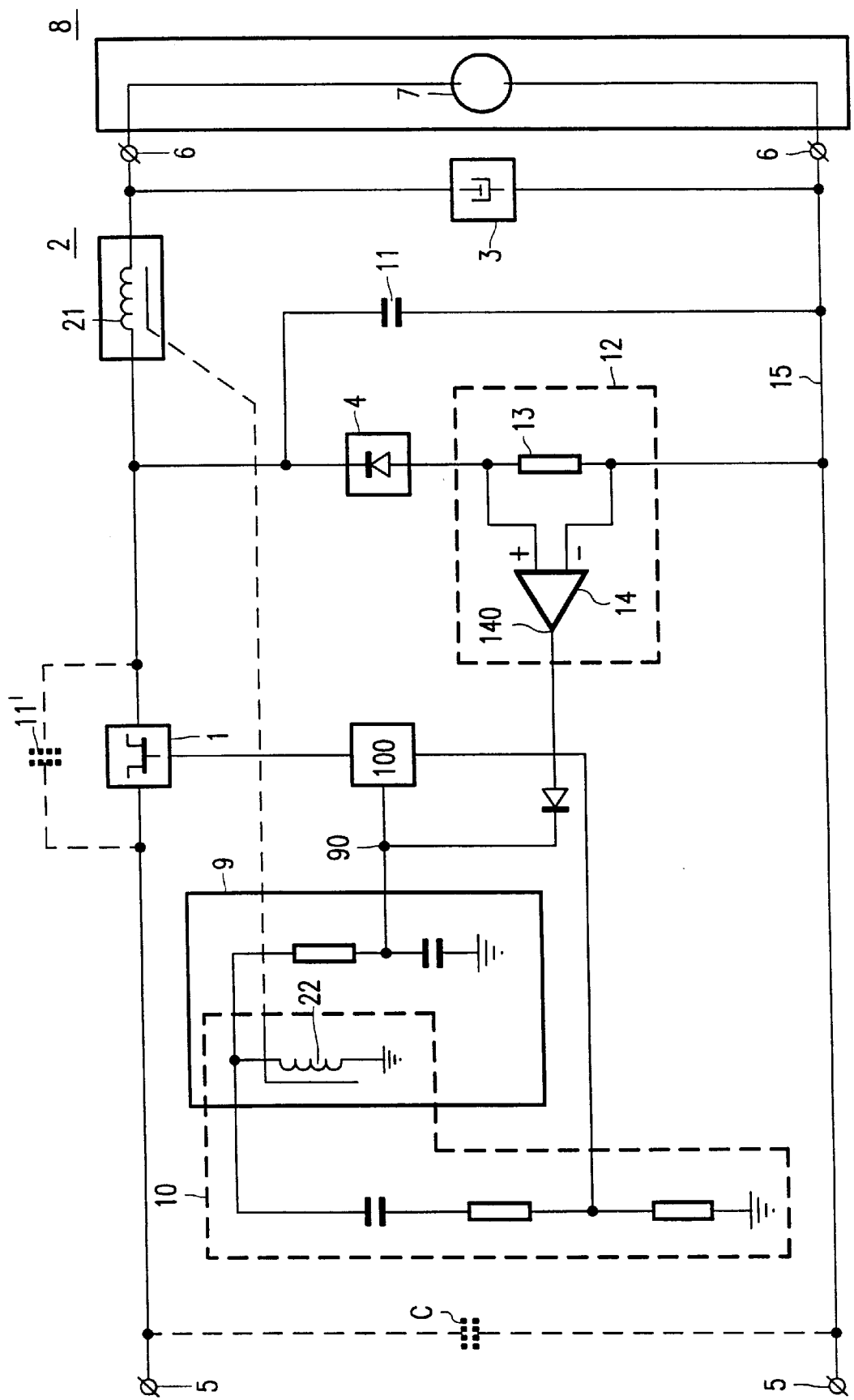

BUCK CONVERTER SWITCHING SCHEME

BACKGROUND OF THE INVENTION

The invention relates to a circuit arrangement for igniting and operating a high-pressure discharge lamp, provided with switching means, inductive means and rectifying means together forming a Buck converter, connected to input terminals for connection to a supply source and output terminals for connection of the lamp, comprising means for supplying the lamp with a current through periodic switching of the switching means alternately into a conducting and a non-conducting state by means of a switch-on and switch-off signal, respectively, which inductive means comprise a primary and a secondary winding, the secondary winding forming part of an integration network for generating the switch-off signal.

A circuit arrangement of the kind mentioned in the opening paragraph is known from European Patent Application EP-A-0 401 931 whose U.S. equivalent is U.S. Pat. No. 5,068,572. The known circuit arrangement is highly suitable for igniting and operating a high-pressure discharge lamp which forms part of a projection TV installation.

The type of switch mode power supply known as Buck converter is also known under other designations such as downconverter, step-downconverter, inductor-coupled step-downconverter and direct-downconverter. An electrical separation in the form of a transformer may be present between input terminals and output terminals.

The Buck converter operates in a self-oscillatory mode in the known circuit arrangement.

It is possible with the known circuit arrangements to supply a substantially constant power to the connected lamp over a comparatively wide current and voltage range, so that a very constant luminous flux is generated by the lamp. The self-oscillatory mode is characterized by low switching losses in the periodic switching of the switching means, especially in the current-voltage range where lamp operation is stable. Preferably, the downconverter is so dimensioned that switching from the non-conducting to the conducting state takes place with a frequency above the limit of human hearing during stable lamp operation. This also has the result that the dimensions of the inductive means can remain comparatively small.

For generating the switch-off signal, a comparison is made in the known circuit arrangement between a separately set control signal and a signal prevalent at an output of the integration network and proportional to the value of the current through the inductive means. The moment the signal at the output of the integration network becomes equal to the separately set control signal, the switch-off signal is generated, whereupon the switching means are switched from the conducting to the non-conducting state.

In the known circuit arrangement, the integration network comprises capacitive means, and the voltage across the capacitive means forms the signal which is proportional to the current value through the inductive means. A controlled current source of comparatively simple construction is realized with the known circuit arrangement by which also the power in a connected load (the lamp) can be controlled. The self-oscillatory mode of the known circuit arrangement is characterized by the fact that the generation of the switch-on signal. The process of switching of the switching means from the non-conducting to the conducting state takes place when the current through the primary winding of the induction means becomes zero. Subsequently a tuned circuit comprising the primary winding of the inductive means is activated. This results in a voltage across the primary winding. The voltage thus generated is transformed to a further secondary winding of the inductive means. The further secondary winding forms a voltage source for generating the switch-on signal. This results in a more complicated circuit construction leading to higher manufacturing cost and making circuit miniaturization more difficult.

SUMMARY OF THE INVENTION

It is an object of the invention to provide a circuit arrangement with a measure for counteracting said disadvantage. According to the invention, the circuit arrangement of the kind mentioned in the opening paragraph is characterized by the secondary winding forming part of a voltage divider circuit for generating the switch-on signal.

The secondary winding acts as a voltage source both for generating the switch-off signal and for generating the switch-on signal. A significant simplification in the construction of the circuit arrangement results improving the chances for minitiaturization and cost reduction in manufacture. advantageously, the switch-on and switch-off signals are generated alternately.

In an advantageous embodiment of the circuit arrangement according to the invention, the primary winding forms a tuned circuit with a capacitance which shunts the rectifying means of the Buck converter. In contrast to the known circuit arrangement in which the capacitor of the tuned circuit containing the primary winding is connected to one of the input terminals, the capacitance is connected to one of the output terminals of the circuit arrangement by way of a common ground point. Consequently, the maximum voltage across the capacitance remains strongly limited compared with the situation in the known circuit arrangement. This results in a further simplification in the construction of the circuit arrangement.

The integration network is supplied with a signal generated by means of detection of a current flowing through the rectifying means while the switching means are in the non-conductive state, with the object of realizing a correct voltage distribution over the integration network at the start of the conducting period of the switching means. For this purpose, the circuit arrangement is provided with suitable detection means in the form of an ohmic impedance. Preferably, the detection means are connected between the rectifying means and a direct electrical connection present between one of the input terminals and one of the output terminals. Detection means positioned in this way have the advantage that their position does not give rise to the supply of a high-frequency interference signal to the input terminals, and thus to the supply source. A further advantage is that the signal generated by the detection means is independent of the voltage delivered by the supply source. The supply of the integration network may as a result be realized in a very advantageous manner through shunting of the ohmic impedance by an operation amplifier (op amp) of which an output is connected to the output of the integration network. This leads to a comparatively very simple circuit construction with the concomitant possibilities for minituarization. It has been ensured in the manner described that a signal proportional to the value of the current through the inductive means is present at the output of the integration network at all times.

BRIEF DESCRIPTION OF THE DRAWING

FIG. 1 shows the circuit arangement for igniting and operating a high-pressure discharge lamp.

DETAILED DESCRIPTION OF THE PREFERRED EMBODIMENT

This drawing shows a diagram of a circuit arrangement for igniting and operating a high-pressure discharge lamp 7, provided with switching means 1, inductive means 2 and rectifying means 4, together forming a Buck converter, connected to input terminals 5 for connection to a supply source and output terminals 6 for connection of the lamp, comprising means 8 for supplying the lamp with a current through periodic switching of the switching means alternately into a conducting and a non-conducting state by means of a switch-on and switch-off signal, respectively, which inductive means 2 comprise a primary and a secondary winding 21, 22, the secondary winding 22 forming part of an integration network 9 with an output 90 for generating the switch-off signal.

The secondary winding also forms part of a voltage divider circuit 10 for generating the switch-on signal.

The Buck converter is also provided with capacitive buffer means 3.

A direct electrical connection 15 is present between one of the input terminals 5 and one of the output terminals 6. An ohmic impedance 13 is connected here between the direct connection 15 and the rectifying means 4. The ohmic impedance forms part of detection means 12 for detecting a current flowing through the rectifying means. The ohmic impedance is shunted by an op-amp 14 of which an output 140 is connected to the output 90 of the integration network 9. It is achieved thereby that the value of the current through the rectifying means is reliably detected and that the signal at the output of the integration network remains proportional to the value of the current through the inductive means.

The circuit arrangement in addition comprises a capacitance 11 which together with the primary winding 21 forms a tuned circuit once current no longer flows through the rectifying means 4 with the switching means 1 being in the non-conducting state. The voltage thus arising across the primary winding induces a voltage in the secondary winding 22, which in its turn forms a voltage source for generating the switch-on signal through voltage divider circuit 10. In an alternative embodiment, a converter portion (not shown) is included between input terminals 5 and switching means 1 for converting the voltage of the supply source to a DC voltage suitable for operating the switching means. The converter ortion comprises inter alia a comparatively large capacitor C connected between the input erminals. The tuned circuit in this case comprises the capacitor C and a capacitor 11' connected across the switching means. Capacitance 11 is not necessary in this embodiment.

The switch-off signal generated in the integration network 9 is sent to a control circuit 100, as is the switch-on signal generated in the voltage divider circuit 10. The control circuit 100 provides the actual control necessary for switching the switching means.

The means 8 containing the lamp comprise a commutator circuit in many practical cases because a current of periodically changing polarity flows through the lamp during lamp operation. The means 8 in general also comprise an igniter circuit for generating a voltage pulse for igniting the lamp. Both the commutator circuit and the ingiter circuit will generally form part of the circuit arrangement according to the invention. The commutator means may be omitted in cases where the lamp is suitable for DC operation.

In a practical realization of the circuit arrangement described, the latter is suitable for operating a high-pressure metal halide lamp of the UHP type made by Philips electronics; practical realization of the circuit arrangement is suitable for connection to a 220 V, 50 Hz supply source. For this purpose, the circuit arrangement is provided with a circuit portion, which is known per se and not shown in the drawing, arranged between the input terminals and the switching means for converting the AC voltage connected to the input terminals into a DC voltage suitable for operating the switching means. The converter portion comprises between the input terminals a capacitor C of 47 $\mu$F. A MOSFET, type IRF840 made by International Rectifier serves as the switching means 1. The inductive means 2 are formed by a transformer with a ferrite core, a primary winding of 100 turns and a secondary winding of 30 turns. The capacitive buffer means have a capacitance value of 0.82 $\mu$F. The rectifying means 4 are formed by a type BYV29F500 diode, made by Philips Electronics. The switching means 1 are shunted by the capacitor 11' of 560 pF. The detection means 12 in the practical embodiment comprise an ohmic impedance of 0.15 $\Omega$ shunted by an operational amplifier of the CA 3140 M96 type. The amplification factor which is set in dependence on the value of ohmic impedance 13, on the dimensions of the components of the integration network, and on the winding ratio between primary and secondary winding of the inductive means 2, is 100/30.

The practical realization of the circuit arrangement described is highly suitable for use in a projection TV installation.

An alternative possible application is, for example, the operation of a discharge lamp in a motorcar lantern system.

It will thus be seen that the objects set forth above and those made apparent from the preceding description are efficiently attained, and since certain changes can be made in the above construction set forth without departing from the spirit and scope of the invention, it is intended that all matter contained in the above description and shown in the accompanying drawings shall be interpreted as illustrative and not in a limiting sense.

It is also to be understood that the following claims are intended to cover all the generic and specific features of the invention herein described and all statements of the scope of the invention, which as a matter of language, might be said to fall therebetween.

What is claimed is:

1. A circuit arrangement for igniting and operating a high-pressure discharge lamp, comprising switching means, inductive means and rectifying means together forming a Buck converter, connected to input terminals for connection to a supply source and output terminals for connection to the lamp for supplying the lamp with a current through periodic switching of the switching means alternately into a conducting and a non-conducting state by means of a switch-on and switch-off signal, respectively, which inductive means comprise a primary and a secondary winding, the secondary winding forming part of an integration network for generating the switch-off signal, characterized in that the secondary winding also forms part of a voltage divider circuit for generating the switch-on signal.

2. The circuit arrangement as claimed in claim 1, characterized in that the primary winding forms a tuned circuit with a capacitance which shunts the rectifying means of the Buck converter.

3. The circuit arrangement as claimed in claim 1, characterized in that the circuit arrangement is provided with detection means for detecting a current flowing through the rectifying means.

4. The circuit arrangement as claimed in claim 3, characterized in that the detection means generate a signal for supplying the integration network during the period in which the switching means is non-conducting.

5. The circuit arrangement as claimed in claim 3, characterized in that a direct electrical connection is present between one of the input terminals and one of the output terminals, and in that the detection means is connected between said direct connection and the rectifying means.

6. The circuit arrangement as claimed in claim 3, characterized in that the detection means comprises an ohmic impedance.

7. The circuit arrangement as claimed in claim 6, characterized in that the ohmic impedance is shunted by an operational amplifier of which an output is connected to the output of the integration network.

8. The circuit arrangement as claimed in claim 2, characterized in that the circuit arrangement is provided with detection means for detecting a current flowing through the rectifying means.

9. The circuit arrangement as claimed in claim 4, characterized in that a direct electrical connection is present between one of the input terminals and one of the output terminals, and in that the detection means is connected between said direct connection and the rectifying means.

10. The circuit arrangement as claimed in claim 4, characterized in that the detection means comprise an ohmic impedance.

11. The circuit arrangement as claimed in claim 5, characterized in that the detection means comprise an ohmic impedance.

12. The circuit arrangement as claimed in claim 8, characterized in that a direct electrical connection is present between one of the input terminals and one of the output terminals, and in that the detection means is connected between said direct electrical connection and the rectifying means.

13. The circuit arrangement as claimed in claim 8, characterized in that the detection means generate a signal for supplying the integration network during the period in which the switching means is non-conducting.

14. The circuit arrangement as claimed in claim 8, characterized in that the detection means comprisesan ohmic impedance.

15. The circuit arrangement as claimed in claim 13, characterized in that the detection means comprises an ohmic impedance.

16. The circuit arrangement as claimed in claim 9, characterized in that the detection means comprise an ohmic impedance.

17. The circuit arrangement for igniting and operating a high-pressure discharge lamp comprising:

a Buck converter including switching means, inductive means and rectifying means for supplying the lamp with a current through periodic switching of the switching means, the inductive means having a primary winding and a secondary winding;

an integration network including the secondary winding of the inductive means for controlling the non-conductive state of the switching means; and a voltage divider circuit including the secondary winding of the inductive means for controlling the conductive state of the switching means.

\* \* \* \* \*